Feb. 10, 1959 E. M. ZIMMERMAN 2,873,232

METHOD OF JET PLATING

Filed June 18, 1956

INVENTOR:
ELIZABETH M. ZIMMERMAN

BY Howson & Howson

ATTYS.

2,873,232

METHOD OF JET PLATING

Elizabeth M. Zimmerman, Sharon Hill, Pa., assignor to Philco Corporation, Philadelphia, Pa., a corporation of Pennsylvania Application June 18, 1956, Serial No. 591,917

14 Claims. (Cl. 204—15)

Figure 1:
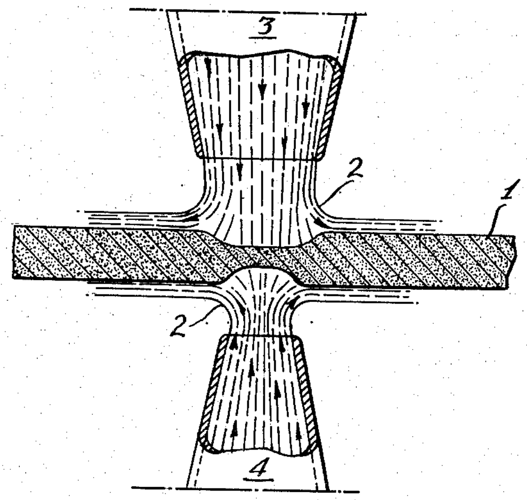

The present invention relates to a novel method of jet plating; and, more particularly, the present invention relates to a novel method for jet plating metallic indium and gallium whereby a plated indium or gallium deposit of controlled size, less than that of the jet orifice, can be readily provided.

Jet plating is a known procedure for electroplating small deposits of metal onto another metal surface. The recently developed method of jet plating of a small deposit onto a semi-conductive material forms the subject matter of copending application Serial No. 472,824, filed December 3, 1954. In jet plating, electrolyte containing a salt of the metal to be deposited is forced through a jet orifice in a direction normal to the plane of the surface onto which the metal is to be plated whereby it impinges the surface at the point at which it is desired to form the deposit. The material onto which the deposit is plated is the cathode, and the jet device is the anode of the system.

One of the presently most prevalent uses of jet plating is in the manufacture of surface barrier transistors and high frequency junction transistors. The manufacture of such transistors involves providing a pair of opposed, closely confronting potential barriers, serving as collector and emitter respectively, in a small, thin wafer of semi-conductive material. Providing these potential barriers involves application of a relatively minute body or dot of an appropriate metal, such as indium or gallium, to the semi-conductive base wafer. Where a high frequency junction device is desired, the resulting assembly is heated to alloy the two materials together at their interface and then cooled to cause recrystalization of the semi-conductive material.

The present invention is particularly adapted to the initial application of the relatively minute dot of metal to the base wafer by means of jet plating. Before jet plating the dots, however, the base wafer is preferably provided with closely-spaced apart, parallel depressions on the opposite faces so that the applied metal dots providing the potential barriers will be as close together as possible. These depressions are formed by jet etching, that is by directing a stream of electrolytic etching solution normal to each of the broad surfaces of the wafer and completing the electrical circuit between the streams and the wafer whereby the wafer is the anode and the jet device the cathode. The area of the pit or depression is determined by the area of the jet orifice, the area of the depression being normally on the same order as or slightly larger than that of the jet orifice. After the desired depressions have been etched into the base wafer, the relatively minute dot of appropriate metal is then plated at the bottom of the depressions. In transistors of the type described, however, it is desirable that the plated dot be sufficiently smaller than the etched pit or depression that it will be limited substantially to the relatively flat bottom portion of the depression. Since, under normal conditions, the size of the dot plated is comparable or in some cases even larger than the area of the jet plating orifice, the provision of a dot of the required smaller size has required, in the past, either a separate set of smaller jet orifices or use of the same jet orifices used during jet etching followed by etching of the resulting plated dot to reduce its dimensions to the desired size. Each of these procedures possesses disadvantages not only from the standpoint of the number of steps, the additional equipment and time required, but also, in the difficulty of preparing satisfactory and readily reproducible products.

It is known that the same electrolyte solution can be employed in jet plating as in jet etching. For example, a solution of zinc sulfate and sulfuric acid in water can be employed for jet plating zinc and the very same solution can be employed for jet etching, requiring only a reversal in direction of current to convert from etching to plating. It will be seen, therefore, that the provision of means whereby the same jet system, including jet orifices, can be used in both the jet plating and jet etching operations to provide, directly as the result of jet plating, a deposit of a size smaller than the depression formed during the jet etching operation would be highly desirable.

In copending application Serial No. 548,090, filed November 21, 1955, is disclosed and claimed a process by which this may be accomplished. Although the process of said copending application is generally applicable in the jet plating of a wide variety of metals, it is especially applicable for the jet plating of zinc.

It is the principal object of the present invention to provide an improved method of jet plating metallic indium and gallium whereby the size of the plated indium or gallium deposit is smaller than the jet orifice.

Another object of the invention is to provide an improved method of jet plating indium and gallium wherein the size of the indium or gallium deposit may be readily controlled to a desired size less than that of the jet orifice by simple variation in the current employed.

A specific object of the present invention is to provide a method of jet plating indium and gallium metal dots in the manufacture of transistors of the types described whereby the same jet system, including jet orifice, can be employed during the jet plating operation as was employed during the jet etching operation with the provision, however, of a plated indium or gallium deposit smaller in size than the depression formed during the jet etching operation.

Other objects will become apparent from a consideration of the following specification and claims.

The method of the present invention involves, in the jet plating of an indium or gallium deposit onto another surface by directing a stream of electrolyte comprising an aqueous solution of indium or gallium salt against the surface onto which the indium or gallium is to be applied and completing the circuit between the jet device and the surface through the electrolyte stream whereby the said surface is the cathode and the jet device is the anode in the system, the improvement which comprises conducting such plating with a compound selected from the group consisting of ethylenediaminetetraacetic acid and its salts dissolved in said electrolyte whereby the plated indium or gallium deposit has a cross-sectional area less than that of the jet orifice.

Figure 2:
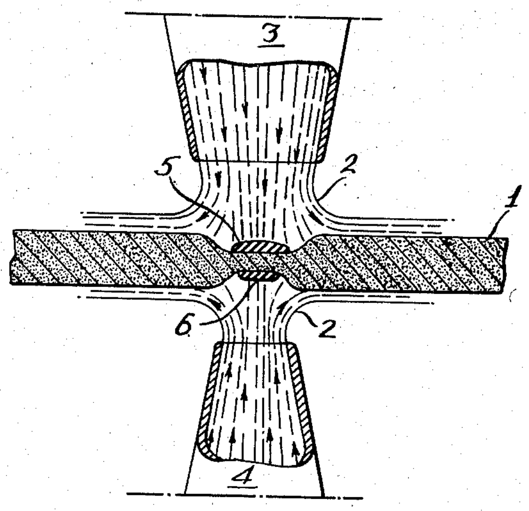

The present method will be more readily understood from a consideration of the drawings in which:

Figure 1 illustrates, in greatly enlarged section, the jet etching of depressions in opposite sides of a base wafer, and Figure 2 illustrates, in greatly enlarged section, the jet plating of a dot of indium or gallium metal in each of the depressions formed during the jet etching operation of Figure 1 and using the same jet system as in Figure 1.

It has been found that, by including in solution in the indium or gallium electrolyte plating bath ethylenediaminetetraacetic acid or a salt thereof, the current can be sharply reduced from that normally employed in jet plating to provide an indium or gallium deposit having a cross-section comparable to that of the jet orifice with the result that a deposit of indium or gallium metal will form that is much smaller in cross-sectional area than the cross-section of the jet orifice employed. Moreover, it has been found, that with the inclusion of the stated additive in the electrolyte solution, simple voltage control permits the deposit size to be varied at will from about ⅜ to about ⅞ the jet diameter. The reason for the foregoing is not presently understood, although it is believed that, by virtue of the presence of the ethylenediaminetetraacetic acid compound, the potential at the center of the jet stream is sharply increased over that at the periphery of the stream near the surface of the wafer. The electrolyte solution selectively plates only when and where the ionic decomposition potential is reached at the surface of the base wafer. Hence, selective deposition occurs at the center of the stream.

At any rate, the present invention results in a high quality indium or gallium metal deposit smaller than the jet orifice employed, and hence smaller than that which would normally result without the use of the stated additive. In a specific embodiment, the invention permits the use, during jet plating in the manufacture of transistors, of the same jet system, including jet orifices, employed during jet etching the desired depressions with assurance, however, that the deposit of indium or gallium metal as the direct result of plating will be smaller in size than the jet orifice opening and hence, smaller than the area of the depression formed during jet etching. Thus, there need be no changeover from one jet system or orifice to another between etching and plating, and there need be no interruption in the etching and plating procedure, only a reversal of the flow of current being necessary to discontinue etching and initiate plating, since, as stated previously, the same electrolyte solution can be employed in both etching and plating. Nor need there be any subsequent etching to reduce the size of the metal deposit to that required in the assembly. The present procedure permits the entire operation from initial etching through plating to be carried out in a single machine, in very short periods of time, on the order of seconds or minutes, and eliminates the handling time, labor and capital investment involved in the operation of separate machines. Because the size of deposit can be controlled electrically by means of the present procedure, the jet plating apparatus can be arranged to provide, by simple electrical adjustments, a wide variety of deposit sizes less than that of the jet orifice.

The base onto which the indium or gallium metal is electrodeposited in accordance with the present method may be any solid material that can be electroplated by conventional means. Such materials embrace any solid material that will conduct electricity to an appreciable degree, such as metals and semi-conductive materials like germanium, silicon, magnesium oxide, lead sulfide, intermetallic compounds, like tellurides, antimonides and arsenides, and the like. Since the present method is particularly applicable for the preparation of potential barriers of the type described, the base will most generally be semi-conductive material, especially silicon or germanium.

The electrolyte solution employed in the jet etching procedure of the present invention will comprise, in addition to the constituents normally used in such procedure, the ethylenediaminetetraacetic acid compound. Such solutions normally comprise an aqueous solution of a salt of the metal, that is of indium or of gallium, to be deposited. The solution may be acid or alkaline, although acid solutions are preferred. Salts significantly soluble in water will be selected, such as the sulfates, chlorides, nitrates, and the like, with the sulfates being preferred. The concentration of the metal salt in the electrolyte solution may vary widely. Generally, as the concentration increases the size of the deposit increases, and this tendency may serve as a means of controlling the size of the deposit along with the additive which has the opposite effect. In some cases the concentration of metal salt can go as high as about 10%, by weight, although normally it will be relatively low, a concentration between about .5% and about 5%, by weight, being particularly suitable.

The present invention is not concerned with the absolute size of the metal deposit, since this may vary widely depending upon the particular type of product desired. In general, however, the jet plating procedure may be employed to provide deposits ranging in size from about .5–1 mil to as high as about .5 inch in diameter. As stated, the present procedure is particularly applicable to the preparation of potential barriers in the manufacture of transistors in which case the diameter of the deposit may range from about .5 to about 20 mils, preferably between about 1 and about 10 mils particularly in the case of potential barriers for high frequency junction transistors.

As stated, the electrolyte solution is preferably acidic in nature, and a pH below about 4 to avoid precipitation is recommended. The pH may go as low as about 1. In accordance with preferred practice, the electrolyte solution will have a pH between about 2 and about 3.5.

Other additives may be included to enhance the activity of the bath and the desirable characteristics of the deposit. For example, salts like ammonium and sodium chloride or sulphate may be added to improve the conductance of the bath; tartaric acid may be included to improve the crystal structure of the deposit; and/or a surface active wetting agent, preferably anionic, like salts of higher fatty acids, such as sodium laurate, and alkyl aryl sulfonates, may be included to aid wetting of the base.

The success of the present procedure depends upon the inclusion in the electrolyte solution of ethylenediaminetetraacetic acid or a salt thereof, all referred to herein generally as ethylenediaminetetraacetic acid compound. The acid itself may be used or any of its salts soluble to the limited extent required may be employed. The acid contains four carboxyl groups, the hydrogen of any one or more of which may be replaced by a metal or ammonium. In other words, the salts may range from mono salts to tetra salts. The most common salts of this acid are the alkali metal salts, like sodium, potassium and lithium, but the alkaline earth metal salts, like calcium, magnesium, and the like, and ammonium salts may be employed. The sodium salts are preferred.

The amount of ethylenediaminetetraacetic acid compound employed may vary over a wide range of concentrations. In general, the amount of compound employed may vary from as low as about 0.1 to as high as about 20 grams per liter.

As far as the temperature of the bath is concerned during the plating operation, no advantage is to be gained by employing temperatures substantially in excess of room temperature, and, in fact, with excessive temperatures the throwing power of the bath may be increased resulting in unsatisfactory deposits. In general, the temperature of the bath during the plating operation may range between about 10 and about 50° C., with a preferred temperature being in the neighborhood of about 15–25° C.

Through the inclusion of the ethylenediaminetetraacetic acid compound in the electrolyte solution in accordance with the present invention, the current employed during jet plating may be substantially reduced from that normally employed in providing a deposit comparable in size to that of the jet orifice. As stated, the current may also be controlled to provide a deposit having any desired size less than that of the jet orifice from about 3/8 to about 7/8 the size thereof. This reduction in current from that normally employed without the inclusion of the ethylenediaminetetraacetic acid compound is not a simple linear function, since, for example, a reduction in current density to about 1/10 of that normally required may provide a deposit about one-half the size of the jet orifice. The exact current employed in practicing the present invention will depend not only upon the desired size of deposit but also upon the metal being deposited and the particular ethylenediaminetetraacetic acid compound selected and hence the makeup of the electrolyte system. Thus, it is not possible to set forth any numerical ranges within which any desired deposit size may be obtained for either indium or gallium using any of the ethylenediaminetetraacetic acid compound. However, no difficulty will be experienced by one skilled in the art in determining the proper current for any selected set of conditions and materials.

Referring to the drawings, Figure 1 represents, in greatly enlarged cross-section, a view of jet etching as used in the preparation of junction and surface barrier transistors. In the embodiment illustrated, pits or depressions are being etched into base wafer 1. The depressions are of different sizes, the larger depression for the collector and the smaller depression for the emitter. 2 represents the electrolyte solution flowing from the respective jet orifices 3 and 4. As illustrated in the drawing, the electrolyte solution is forced through the respective orifices in a direction normal to the plane of the base wafer 1 so that each stream impinges at the point at which it is desired to etch into the base. Not shown in the drawing are the conventional means for holding the base 1 between jet orifices 3 and 4 and for controlling the distance between the orifices and the surface of the base wafer, as well as the overall jet mechanism including reservoirs for electrolyte solution, filters, valves, air pressure connections and electrical connections.

In Figure 2 is illustrated the jet plating of metal deposits at the bottom of the depressions etched in accordance with Figure 1 and employing the same electrolyte solution and mechanism as employed in Figure 1. In this case, the base 1, electrolyte solution 2 and jet orifices 3 and 4 are the same as described in Figure 1, the only difference being that the flow of current is reversed with respect to that employed during etching in Figure 1. During plating as illustrated in Figure 2, a deposit of the desired metal forms at the bottom of the depression, the deposit in the collector depression being designated 5, and the deposit at the bottom of the emitter depression being designated 6. As shown in the drawing the size of the deposit is substantially less than that of the respective jet orifice.

The method of the present invention will be more readily understood from a consideration of the following specific examples which are given for the purpose of illustration only and are not intended to limit the scope of the invention in any way.

*Example I*

A strip of germanium is ground to a thickness of 7 mils and cut on a cavitron into discs 90 mils in diameter. These discs are then etched in a bath containing nitric acid, acetic acid and hydrofluoric acid to a thickness of 2 mils, and this reduces the diameter to approximately 75 mils.

The resulting blank is then mounted horizontally between two opposed jets having orifice diameters of 3 and 5 mils, respectively, the smaller jet being directed upwardly and the larger jet being directed downwardly upon the blank. Each jet is provided with its own solution reservoir, valve, electrode, filter and air pressure connection. Positive and negative power supplies are provided for etching and plating. Plating and etching currents are controlled by series potentiometers and monitored by 0–2 ma. meters.

The electrolyte solution employed, both for etching and for plating is prepared by dissolving 15.4 grams of indium sulfate, 22 grams of ammonium chloride, 1.5 grams of tartaric acid, 1 gram of sodium laurate and 1.7 grams of the tetra sodium salt of ethylenediaminetetraacetic acid in 1 liter of water. The temperature of the bath is 20° C.

The blank is first etched to provide two pits the bottoms of which are about 0.1 mil apart, and the diameters of the pits are 10 and 6 mils, respectively. This takes about 45 seconds. During etching the current applied at the upper jet is 0.6 milliamperes and the current applied at the bottom jet is 0.2 milliampere.

When the desired pits have been provided in the blank, the current is reversed to begin plating indium deposits in each of the pits. Employing a plating current of .2 milliampere in the top jet and of .1 milliampere in the bottom jet produces indium deposits of 3 and 1.5 mils in diameter, respectively, in 10–15 seconds.

*Example II*

In this example the procedure of Example I is followed except that the jet etching and jet plating electrolyte is prepared by dissolving 6.4 grams of gallium sulfate and 10 grams of sodium hydroxide in 1 liter of water, titrating to a pH of 3 with hydrochloric acid and then slowly adding 1.5 grams of tartaric acid, 0.5 gram of sodium laurate and 1.7 grams of tetra sodium salt of ethylenediaminetetraacetic acid.

Gallium metal deposits of 3 and 1.5 mils diameter are formed in the top and bottom pits, respectively.

Considerable modification is possible in the selection of ethylenediaminetetraacetic acid compound and other constituents of the electrolyte bath as well as in the amounts thereof and in the conditions and techniques employed without departing from the scope of the invention.

I claim:

1. In the jet plating of a deposit of metal selected from the group consisting of indium and gallium onto another surface involving directing a stream of electrolyte comprising an aqueous solution of salt of said metal to be deposited against the surface onto which the deposit is to be applied and completing the circuit between the jet device and the surface through the electrolyte stream whereby the said surface is the cathode and the jet device is the anode in the system, the improvement which comprises conducting such plating with a compound selected from the group consisting of ethylenediaminetetraacetic acid and salts thereof dissolved in said electrolyte while maintaining a current density during said plating whereby the plated deposit has a cross-sectional area less than that of the jet orifice.

2. The method of claim 1 wherein said compound is an alkali metal salt of ethylenediaminetetraacetic acid.

3. The method of claim 2 wherein said salt of said metal to be deposited is an indium salt.

4. The method of claim 3 wherein said salt of ethylenediaminetatraacetic acid is the tetra sodium salt.

5. In the jet plating of a deposit of metal selected from the group consisting of indium and gallium onto another surface involving jet etching a depression in said surface and then directing a stream of electrolyte comprising an aqueous solution of salt of said metal to be deposited against the surface at the site of the depression and completing the circuit between the jet device and the surface through the electrolyte stream whereby the said surface is the cathode and the jet device is the anode in the system, the improvement which comprises conducting said jet etching with said electrolyte having dissolved therein a compound selected from the group consisting of ethylenediaminetetraacetic acid and salts thereof and, without interrupting the flow of electrolyte, reversing the flow of current to discontinue etching and to initiate plating, and maintaining a current density during said plating less than the current density maintained during said etching whereby the plated deposit has a cross-sectional area less than that of the jet orifice.

6. In the fabrication of potential barriers in the manufacture of surface barrier or high frequency junction transistors involving jet etching depressions into opposite faces of a wafer of semi-conductive material and jet plating a small deposit of metal selected from the group consisting of indium and gallium in said depressions by directing a stream of electrolyte comprising an aqueous solution of salt of said metal to be deposited at each depression and completing the circuit between the jet device and the semi-conductive material through the electrolyte stream whereby the semi-conductive material is the cathode and the jet device the anode in the system, the improvement which comprises conducting said jet etching with said electrolyte having dissolved therein a compound selected from the group consisting of ethylenediaminetetraacetic acid and salts thereof and, without interrupting the flow of electrolyte reversing the flow of current to discontinue etching and to initiate plating, maintaining a current density during said plating less than the current density maintained during said etching whereby the plated deposit has a cross-sectional area less than that of the jet orifice.

7. In the jet plating of a deposit of metal selected from the group consisting of indium and gallium onto another surface involving directing a stream of electrolyte comprising an aqueous solution of salt of said metal to be deposited against the surface onto which the deposit is to be applied and completing the circuit between the jet device and the surface through the electrolyte stream whereby the said surface is the cathode and the jet device is the anode in the system, the improvement whereby the size of the deposit may be controlled to a cross-sectional area less than that of the jet orifice which comprises conducting such plating with a compound selected from the group consisting of ethylenediaminetetraacetic acid and salts thereof, dissolved in said electrolyte while maintaining a current density during plating whereby the plated deposit has a desired diameter from about ⅜ to about ⅞ of that of the jet orifice.

8. The method of claim 5 wherein the compound is an alkali metal salt of ethylenediaminetetraacetic acid.

9. The method of claim 8 wherein the salt of ethylenediaminetetraacetic acid is a sodium salt.

10. The method of claim 6 wherein the compound is an alkali metal salt of ethylenediaminetetraacetic acid.

11. The method of claim 10 wherein the salt of ethylenediaminetetraacetic acid is a sodium salt.

12. The method of claim 7 wherein the compound is an alkali metal salt of ethylenediaminetetraacetic acid.

13. The method of claim 12 wherein the salt of ethylenediaminetetraacetic acid is a sodium salt.

14. The method of claim 13 wherein the salt of ethylenediaminetetraacetic acid is the tetra sodium salt.

References Cited in the file of this patent

UNITED STATES PATENTS 2,751,341 Smart ---------------- June 19, 1956

OTHER REFERENCES

Tiley et al.: "Proceedings of the I. R. E.," vol. 41 (December 1953, pp. 1706–1708).